9044X
PATENTED AUG. 20, 1835.
J. FALES.
MACHINE FOR SERVING ROPE OR RIGGING.
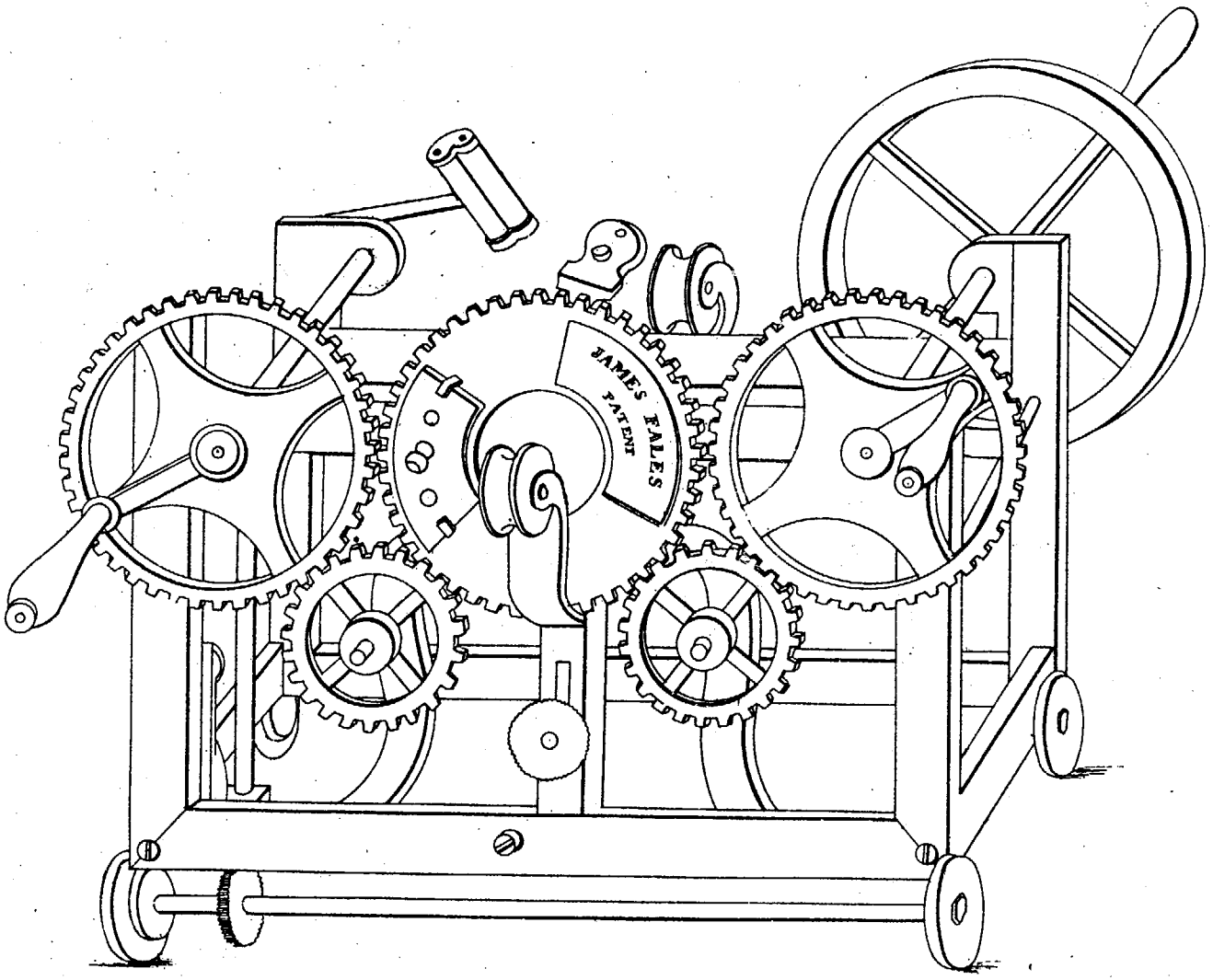

9044X    Aug. 20. 1835

James Fales New Bedford Massachusetts

Letters Patent

The Schedule referred to in these Letters Patent and making part of the same
containing a description in the words of the said James Fales himself of his im-
provement in a machine for serving Ropes or Rigging.

To all persons to whom these presents shall come James Fales of New Bed-
ford in the County of Bristol and Commonwealth of Massachusetts Watchma-
ker sends Greeting — Be it known that I the said James Fales have in-
vented constructed and applied to use a new and useful machine called a ma-
chine for serving Ropes ~~and~~ or Rigging which is specified in the words following
viz. Upon a horizontal frame or traveller of timber moving upon Rollers is
erected a perpendicular frame to support the working part of the machine.
At a convenient hight from the floor a cog wheel with a hollow or tubular
shaft or axle is attached to the aforesaid perpendicular frame. This wheel is
made in two parts or pieces one of them being two thirds or three fourths
of the whole circle is cast with the shaft or else attached firmly to it
The remaining portion is moveable so that it may be taken out to ad-
mit the rope intended to be served into the hole or tube and again
returned to its place. where it may be secured by means of screws gripes
or any other simple contrivance the tube should be of sufficient diam-
eter to admit a rope of any size proposed to be served. Upon this shaft
or axle and behind the frame is placed a rack containing the reel upon
which the serving yarn is to be wound and also a serving mallet. Be-
tween the reel and mallet may be placed screws or springs to operate upon
the reel by friction or otherwise in such a way as to prevent its revolving faster
than the yarn can be used upon the rope. The mode of operation of this
machine is as follows. The rope being stretched taut in a horizontal po-
sition and securely fastened; the machine is brought where the rope can be pas-
sed through the tube in the wheel above described the yarn from the reel is then
passed around the Rope and mallet in the usual manner and motion being

9044X given to the wheel either by means of a crank directly applied or otherwise by means of the interven-
tion of another wheel and pinion the work is very accurately and expeditious-
ly performed. And the said James Fales claims to be the inventor of
the above described combination of machinery and its application to the pur-
pose of Serving Ropes or Rigging. In testimony that the above is
a true Specification of my said machine as above described I have here-
unto set my hand this twenty first day of March in the year of our Lord
One thousand eight hundred and thirty five James Fales Witnesses
Daniel Howland Jr.
Ezra Bassett Entd. [illegible]

(481 Words)

Patented 20 August 1835

(Drawing).

Aug 20 1835